2 Sheets--Sheet 1.

J. R. BARRY.
Cushion-Cleaning Machine.

No. 166,841.  Patented Aug. 17, 1875.

Witnesses  Inventor

2 Sheets--Sheet 2.

J. R. BARRY.
Cushion-Cleaning Machine.

No. 166,841.

Patented Aug. 17, 1875.

Witnesses
S. J. Van Stavoren.
Jno. B. Connolly

Inventor
Job R. Barry
By Connolly Bros., Attorneys

UNITED STATES PATENT OFFICE.

JOB R. BARRY, OF PHILADELPHIA, PENNSYLVANIA, ASSIGNOR OF ONE-HALF HIS RIGHT TO WILLIAM R. JEROME, OF SAME PLACE.

IMPROVEMENT IN CUSHION-CLEANING MACHINES.

Specification forming part of Letters Patent No. 166,841, dated August 17, 1875; application filed February 26, 1875.

*To all whom it may concern:*

Be it known that I, JOB R. BARRY, of Philadelphia, in the county of Philadelphia and State of Pennsylvania, have invented certain new and useful Improvements in Cushion-Cleaning Machines; and I do hereby declare the following to be a full, clear, and exact description of the invention, such as will enable others skilled in the art to which it pertains to make and use it, reference being had to the accompanying drawings, which form part of this specification, in which—

Figure 1:
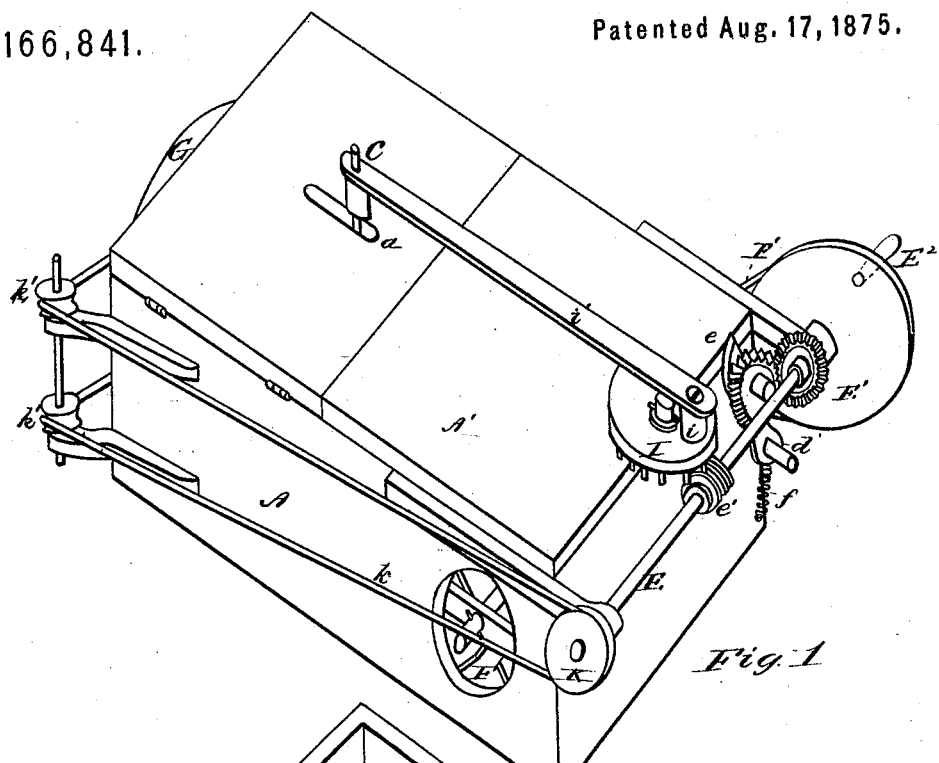
Figure 2:
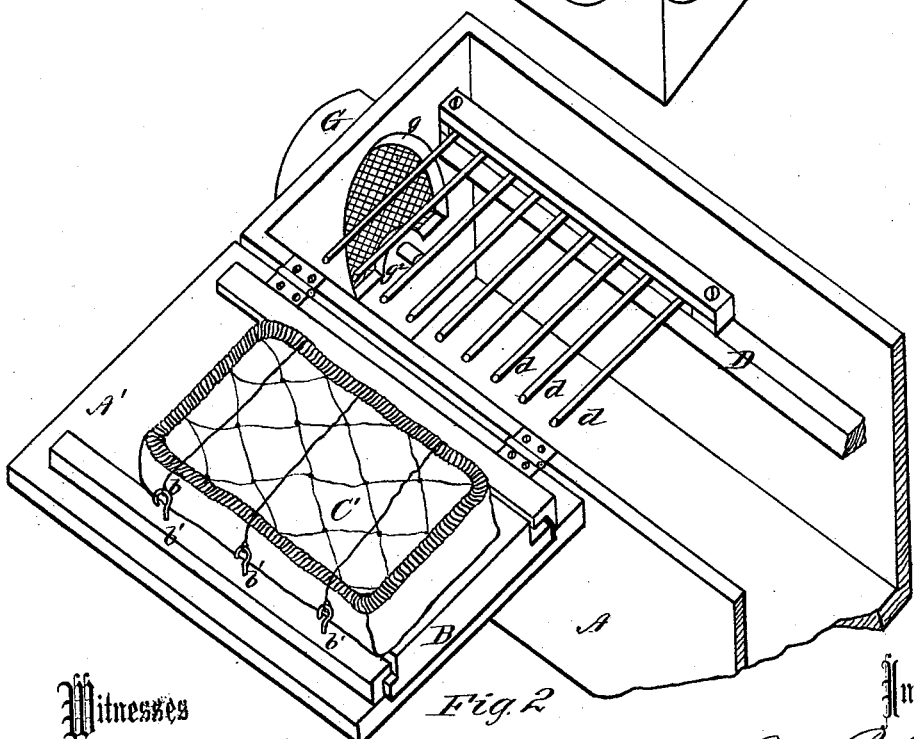
Figure 3:
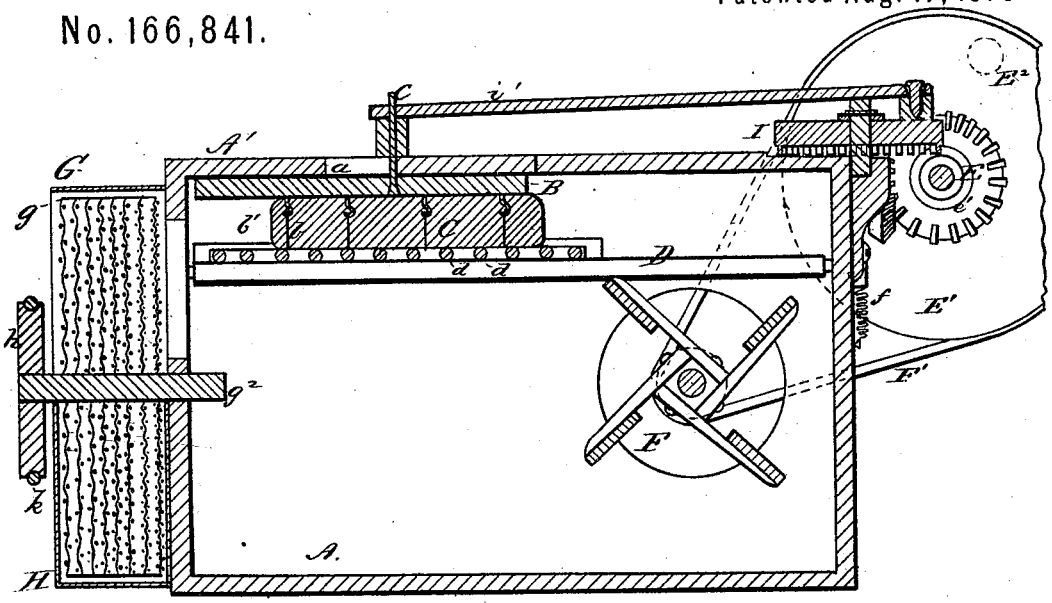
Figure 4:
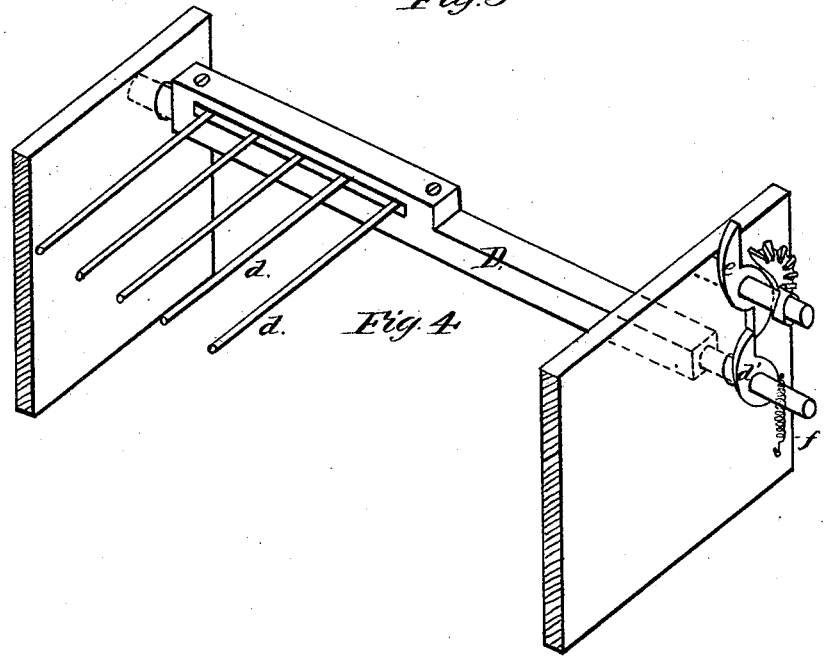

Figure 1 is a perspective view of the complete machine closed. Fig. 2 is a perspective view, partly broken away, showing lid open. Fig. 3 is a vertical longitudinal section. Fig. 4 is a perspective view of whipping shaft and rods with operating attachments.

This invention is for the purpose of raising dust from cushions, and is especially designed and adapted to the cleaning of cushions of railroad-cars. It consists of a box of the required length, having a hinged lid with a sliding frame attached; a vibrating shaft, to which are fastened the rods that whip the cushion; a fan-blower to drive the dust off from the cushion as fast as it is whipped out; a dust-arrester, and suitable shafts, wheels, cams, pulleys, &c., to give the proper movements.

Referring to the accompanying drawing, A is a close box, having a hinged lid, A', to the under side of which is attached a frame, B, that moves in guides, so arranged as to hold the frame up to the lid when it is turned down on the box A. The cushion to be cleaned is fastened to this frame B by means of a cord, $b$, passing over hooks $b'$ $b'$ in the side of the frame. D is a shaft, to which rattan or other suitable rods are attached, this shaft running the entire length of the box A, and made to vibrate by means of a transverse shaft, E, cams $d'$ $e$, and a spring, $f$. On the shaft E is a large pulley, $E^1$, serving, also, as a fly-wheel, to which is attached a handle, $E^2$, by turning which the machine is operated. F is a fan-blower, driven, as shown, by the belt F', running from the pulley $E^1$. G is the dust-arrester, located at the end of the box A, and composed of a series of disks, $g$ $g$, of wire-gauze, inclosed in a cylinder, G, of the same material, said cylinder and disks being arranged to revolve in an outer case, H, to be filled about one-third its depth with water. This dust-arrester may be used or not, as may be desired. If it be not used, the dust from the machine may be permitted to find its egress through a window, flue, or other channel, according to the exigency of the occasion. $e'$ is a worm on the shaft E, meshing with the crown-wheel I, which, through its crank $i$ and arm $i'$, connecting with the pin C, projecting from the frame B through a slot, $a$, in the lid A', gives motion to the said frame in its guides, thus insuring a uniform distribution of the blows of the whipping-rods. K is a pulley on the shaft E, and $k$ a cord or belt proceeding therefrom around the corner pulleys $k'$ $k'$ to the pulley $h$ on the shaft $g^2$, thereby communicating the requisite rotary motion to the cylinder G and disks $g$.

The operation is as follows: The lid A' is first turned back, and the cushion C' secured in the frame B by means of the cord $b$. The lid is then turned down and securely fastened, and the arm $i'$ brought into connection with the pin C. The handle $E^2$ is then turned, causing the several parts to move, the cushion to traverse back and forth, the rods $d$ $d$ to strike it, and the fan F to blow off the whipped-out dust, which is arrested by the disks $g$ and screen G.

As in this machine the blows are struck up instead of down, and on the under side of the cushion, the dust settles down and out of the cushion by gravity; whereas, when blows are struck from above, much of the effect is to settle the dust already in the cushion farther in, so that cushions cannot effectually be cleaned in that way.

The revolution of the cylinder G and disks $g$ through the water contained in the case H wets the whole surface of said cylinder and disks, and the dust, impinging upon this surface, is effectually arrested, and prevented from filling the surrounding atmosphere.

I have shown and described only one shaft, D; but in practice I design employing another similar shaft on the opposite side of the box, having rods $d$ $d$ arranged to break joints or alternate with those on the shaft D. The rods on each shaft are to be placed about four inches apart, so that, when the two shafts are arranged as described, the distance between their respective rods will be, say, two inches.

What I claim as my invention is—

1. A car-cushion-cleaning machine having a lid, A', provided with a traversing frame, B, substantially as shown and described.

2. The combination, with the beater-shaft D and main shaft E, of the worm $e'$, wheel I, arm $i'$, and traversing frame B, operating in unison, substantially as shown and described.

3. A dust-arrester having a wire screen or disk or disks, $g$, for the purpose set forth.

4. The cylinder G, disks $g$, and case H, constructed and operating substantially as shown and described.

5. The combination of the box A, having the hinged lid A' and traversing frame B, the whipping-shaft D, having rods $d\ d$, the fan-blower F, shaft E, and dust-arrester G H, constructed and arranged for operation substantially as shown and described.

In testimony that I claim the foregoing I have hereunto set my hand this 26th day of January, 1875.

JOB R. BARRY.

Witnesses:
JNO. A. BELL,
M. DANL. CONNOLLY.